United States Patent [19]

Germain

[11] 4,037,887
[45] July 26, 1977

[54] UNIVERSAL-JOINT ASSEMBLIES AND SELF-ALIGNING THRUST BEARINGS, ESPECIALLY FOR THE SHAFTS OF ROTATING MACHINES

[75] Inventor: Roger Louis Elysée Germain, Maisons-Lafitte, France

[73] Assignee: Societe Nationale d'Etude et de Construction de Moteurs d'Aviation, Paris, France

[21] Appl. No.: 685,128

[22] Filed: May 10, 1976

[30] Foreign Application Priority Data

May 14, 1975 France .................................. 75.15575

[51] Int. Cl.² ............................................ F16C 23/00
[52] U.S. Cl. ...................................... 308/72; 308/140
[58] Field of Search ......................... 403/124, 125, 77; 308/72, 140

[56] References Cited

U.S. PATENT DOCUMENTS

| | | | |
|---|---|---|---|
| 3,260,543 | 7/1966 | Biabaud | 308/72 |
| 3,290,897 | 12/1966 | Kuehn | 308/92 |
| 3,442,561 | 5/1969 | Biabaud | 308/72 |

*Primary Examiner* — Joseph F. Peters, Jr.
*Assistant Examiner* — Gene A. Church
*Attorney, Agent, or Firm* — Cameron, Kerkam, Sutton, Stowell & Stowell

[57] ABSTRACT

A thrust-bearing and guiding assembly which permits limited angular displacement of a rotating shaft in any axial plane while preventing axial translation motion of the shaft comprises a bearing support articulated within a stator housing. The bearing support has two spherical sliding zones which form part of spheres having different centers, one zone being adapted to cooperate with a complementary surface of a ring which is endowed with freedom of sliding motion in the transverse direction with respect to the axis of the rotor within the stator housing.

5 Claims, 8 Drawing Figures

UNIVERSAL-JOINT ASSEMBLIES AND SELF-ALIGNING THRUST BEARINGS, ESPECIALLY FOR THE SHAFTS OF ROTATING MACHINES

This invention relates to universal-joint assemblies and is more especially concerned with self-aligning thrust bearings designed to guide a rotating shaft so as to prevent axial translational displacement while permitting limited angular displacement of the shaft in any axial plane. The invention applies advantageously to rotating machines having a vertical axis and provided with a moving element or rotor of substantial weight and large diameter.

In universal-joint assemblies of known types, the two portions of surface of the spherical bearing which abut in opposite directions against complementary portions of surface of the bearing housing in order to define spherical sliding zones which permit limited angular displacement of the shaft are usually convex and concentric spherical zones. As will be shown in the following description, this arrangement makes it necessary to provide an articulated coupling of substantial bulk and weight if this latter is intended to carry heavy loads. If it is desired in addition to maintain accurate axial positioning of the shaft, the articulated coupling must be designed with very small running clearances which are incompatible with sliding motion without any attendant danger of jamming or seizure.

The invention makes it possible to overcome these disadvantages, in particular to construct self-aligning thrust bearings of small overall size for rotating machines having a vertical axis and a heavy rotor and to ensure correct centering of the rotating shaft without any risk of vibrations, irrespective of the direction of thrust during operation.

In order to reduce the bulk of the bearing and the dangers mentioned above, consideration has accordingly been given to the possibility of bringing the spherical sliding zones closer together, subject to the provision of a certain degree of freedom of transverse movement of one of these zones. The object of this arrangement is to ensure that the spherical centers of said zones no longer coincide and that each center, looking from the zone defined by this latter, is located beyond the other zone. This form of construction is suitable only if certain operating conditions are satisfied. It is for this reason that the invention provides a universal-joint assembly in which at least one of the portions of spherical thrust-bearing surface of the assembly is concave whereas the portion of surface of complementary shape of the bearing housing is consequently concave. As a preferable feature, the other portion of spherical thrust-bearing surface of the assembly is convex whereas the portion of surface of complementary shape of the bearing housing is consequently concave.

Further properties and advantages of the invention will become apparent from the following description of self-aligning thrust bearings which embody the characteristic features outlined in the foregoing in comparison with known self-aligning thrust bearings, reference being made to the accompanying drawings, wherein.

Except where the description makes it necessary, there have not been shown in these figures those elements or arrangements which are not likely to provide a clearer understanding of the invention such as, for example, the lubricating devices and ducts, the detailed arrangements and planes of joints permitting assembly and disassembly, the assembly elements and so forth.

Figure 1:
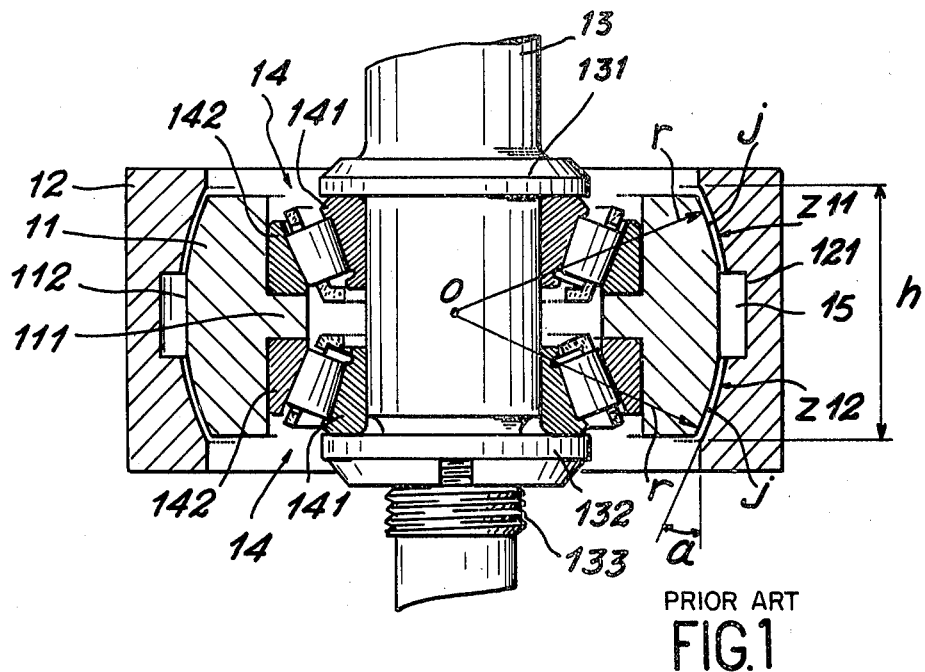
FIG. 1 is an axial sectional view of a self-aligning thrust bearing of known type.

Reference will first be made to FIG. 1 in order to analyze the disadvantages of a self-aligning thrust bearing of known type comprising an articulation in which the spherical sliding zones form part of the same sphere.

The spherical bearing 11 which is capable of oscillating within the bearing housing 12 supports the shaft 13 by means of two symmetrical tapered roller bearings 14. The inner rings 141 of the bearings 14 are fitted on the shaft 13 and clamped in position between a fixed annular flange 131 and a nut 132 which forms an annular flange and is screwed on the threaded portion 133 of the shaft 13. The spherical bearing 11 which is bored so as to permit the assembly of the outer bearing-rings 142 is held in position between said bearing-rings by means of its internal collar 111. Disregarding the mean clearance $j$, it is apparent that the sliding motion between the bearing housing 12 and the spherical bearing 11 is carried out over a spherical zone having a radius $r$, the center $o$ of which is located on the axis of the shaft 13. In fact, said sliding zone is divided into two spherical zones $z1$ and $z2$ by means of an annular channel 15 delimited by an annular groove 121 formed in the bearing housing 12 and by a portion of cylinder 112 which is machined at the periphery of the spherical bearing 11 and makes it possible among other functions to ensure lubrication of the spherical bearing through orifices (not shown).

By means of this thrust-bearing system, the shaft 13 is in principle endowed with a possibility of angular displacement about the center $o$ while accurate axial positioning of the shaft is ensured. But if the total height $h$ of the sliding zones is small, then on the one hand the angle of thrust $a$ is reduced and there is an attendant danger of jamming when the axial load is of high value; in addition, it is found necessary to reduce the clearance $j$ between the spherical bearing and its housing in order to limit axial play but this increases the difficulties involved in machining as well as the potential danger of jamming during operation. In order to overcome these disadvantages, consideration can be given to the possibility of increasing the height $h$ in order to increase the angle of thrust $a$ and to reduce axial play. But when axial loads become substantial, this results in a thrust bearing of excessive bulk and weight in respect of a given shaft diameter.

Before describing with reference to FIG. 8 one example of construction of a self-aligning thrust bearing in accordance with the invention, consideration will be given to FIGS. 2 to 7 which are schematic diagrams of self-aligning thrust bearings in accordance with the invention which make it possible to overcome the disadvantages of the thrust bearing shown in FIG. 1. In all these diagrams, the remedy consists in defining the two spherical sliding zones $z1$ and $z2$ by means of spheres having centers and even radii which are different so that the summits of the zones are appreciably closer to each other than if the zones formed part of the same sphere. In order that angular displacement of the shaft should remain possible without having to admit of excessive clearances, it is usually found necessary to endow the spherical center of one of the zones ($z2$ in the figures under consideration) with a certain freedom of transverse displacement. To this end, the support of the corresponding portion of surface of the spherical bearing housing is constituted by a so-called "floating" ring which is abuttingly applied against the body of the housing with freedom of transverse sliding motion.

The thrust bearings of FIGS. 2 to 7 which are shown in the operating position are intended to guide a rotor (not shown) in a rotating machine having a vertical axis, the center of gravity of the rotor being designated by the letter G. Said rotor is assumed to be located above the articulation. The reference O1 designates the fixed point which is the spherical center of the zone $z1$ formed in the spherical-bearing housing; the center of the floating zone $z2$ is not illustrated.

Figure 2:
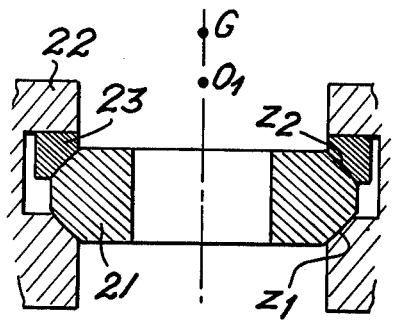

In FIG. 2, the portions of the spherical bearing 21 which define the sliding zones $z1$ and $z2$ are both convex. The floating ring 23 which cooperates with the spherical bearing 21 by means of the zone $z2$ is placed above said spherical bearing. The zone $z1$ is therefore located beneath and the center O1 which is close to the center of gravity G is located above. In the stationary position, the spherical bearing 21 which is urged in the downward direction by the weight of the rotor is correctly centered on the bearing housing 22 by means of the zone $z1$. But when the machine is in operation, if the spherical bearing 21 is urged upwards by the reactions of the rotor and bears on the floating ring 23 by means of the zone $z2$, centering is no longer ensured.

Figure 3:
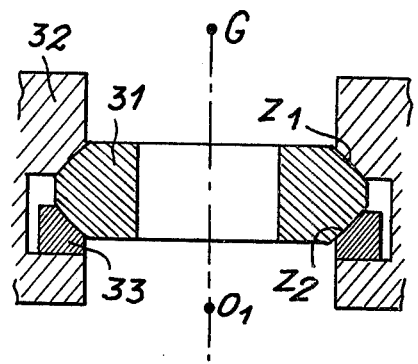
FIGS. 2 and 3 are diagrammatic sectional views of self-aligning thrust bearings having two convex and non-concentric sliding surfaces.

FIG. 3 illustrates the other solution which is evidently possible with a biconvex spherical bearing. When the machine is stopped, the spherical bearing 31 rests on the floating ring 33 which abuts against the bottom portion of the bearing housing 32. The zone $z1$ is therefore located so as to ensure accurate centering of the spherical bearing during operation with upward thrust of the rotor; the fact that it is not so centered in the stationary position is practically not subject to any disadvantage. On the other hand, a study of FIGS. 4 and 5 shows that the concavo-convex spherical thrust bearings make it possible to ensure centering under any operating conditions.

Figure 4:
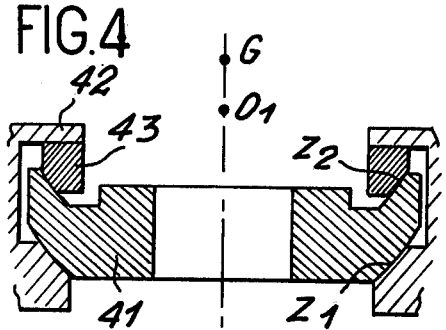
FIGS. 4, 5, 6 and 7 are diagrammatic sectional views of self-aligning thrust bearings in which at least one of the portions of spherical surface is concave.
Figure 5:
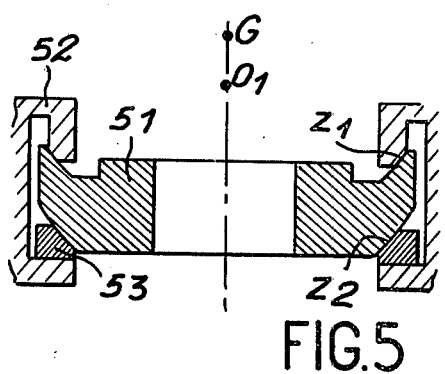

In FIG. 4, the convex face of the spherical bearing 41 is in abutment in the stationary position against the fixed portion of the housing 42 (fixed spherical zone $z1$). The concave face of the bearing defines the floating sliding zone $z2$ in conjunction with the floating ring 43. The fixed center O1 is very close to the center of gravity. As in the case of the biconvex spherical bearing of FIG. 2, centering during operation is correct only if the reaction of the rotor during operation takes place in the downward direction, that is, in the same direction as the thrust in the inoperative state. But if this reaction is exerted in the upward direction, it is only necessary as shown in FIG. 5 to place the floating ring 53 beneath the convex face of the spherical bearing 51 by shaping it accordingly. When the thrust assumes an upward direction, the top concave face of the spherical bearing 51 abuts against the portion of complementary shape of the fixed portion of the housing 52. In the inoperative state, centering is not ensured but this is not objectionable; on the other hand, centering takes place automatically at the time of operation. It must be noted that, in the two cases of FIGS. 4 and 5, the distance of overhang between G and O1 can be made very short by modifying the radius of the spherical zone $z1$.

The concavo-convex spherical bearing can therefore be readily adapted to obtain at the same time a small overhang and correct centering during operation, irrespective of the direction of thrust.

Figure 7:
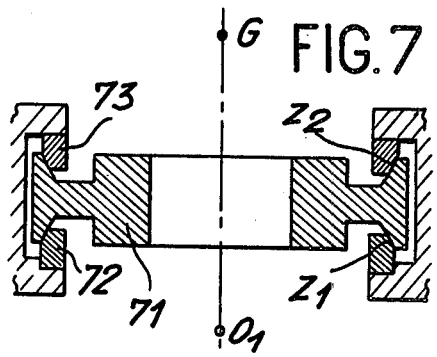
Figure 6:
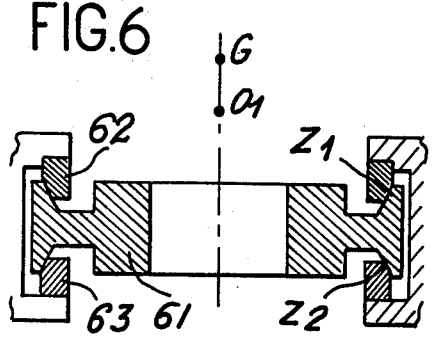

Finally, the invention makes it possible to construct a biconvex spherical bearing as shown in FIGS. 6 and 7. In FIG. 6, the two contacting faces of the bearing 61 are concave spherical zones. Said bearing abuts in the bottom position against the floating ring 63 and in the top position against the portion of complementary shape of the bearing housing 62. In FIG. 7, the spherical bearing 71 is also biconcave but the floating ring 73 is placed above whilst the spherical bearing abuts in the bottom position against the portion of complementary shape of the bearing housing 72. From the positions of the points G and O1 in these two figures, it is apparent that only the form of construction shown in FIG. 6 provides a machine rotor having a vertical axis both with correct centering during operation and with a small value of overhang of the center of gravity on condition, however, that the thrust exerted by the rotor during operation is oriented upwards if the center of gravity G is located above the spherical bearing.

It can thus be stated in a general manner that, whereas spherical bearings of the biconvex type (as shown in FIG. 2) make it possible to obtain correct centering only when the thrust is oriented in the direction: center of gravity — spherical bearing, the floating ring being placed against that face of the spherical bearing which is nearest said center of gravity, spherical bearings of the biconcave type make it possible to obtain correct centering when the thrust is oriented in the direction: spherical bearing — center of gravity, the floating ring being placed in this case against that face of the spherical bearing which is remote from said center.

When the operating conditions make it possible to do so, a biconcave spherical bearing can accordingly be employed instead of a concavo-convex bearing (shown in FIG. 4). By reason of its symmetry, a biconcave bearing has the advantage of easier and more economical machining; it can also have smaller overall dimensions in the axial direction by reason of the fact that the housing embraces two concave spherical zones.

Figure 8:
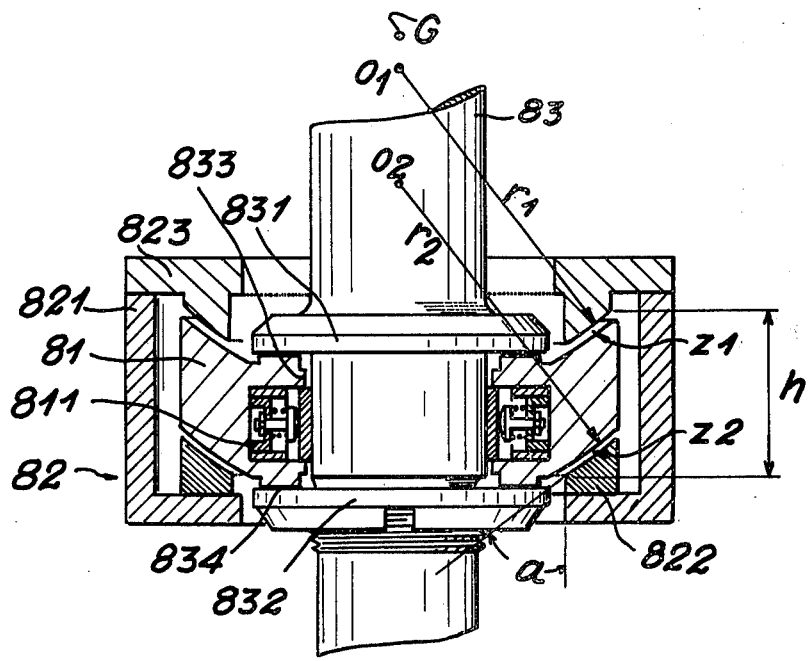
FIG. 8 is an axial sectional view of one example of construction of a self-aligning thrust bearing in accordance with the invention.

FIG. 8 shows an example of construction of an articulation of the concavo-convex self-aligning thrust-bearing type in accordance with the invention for a rotating machine having a vertical axis in which the center of gravity G of the rotor is located above the thrust bearing, said rotor being intended to exert an upward thrust during operation. FIG. 8 in fact shows one application of the diagram of FIG. 4. The coupling with freedom of rotational movement between the spherical bearing 81 and the shaft 83 is ensured by means of a guide bearing 811 of the fluid-film lift type described in French Pat. No. 2,147,398. As mentioned in this patent, the bearing is provided with movable bearing-bushes which are urged back towards the shaft by spring-loaded pushers so as to work under optimum hydrodynamic conditions. The guide bearing 811 is fitted within an annular chamber formed in the bore of the spherical bearing 81 which is in turn inserted between the annular flanges 831 and 832 of the shaft 83. In order to permit assembly, the spherical bearing 81 is separable into two halves having an axial joint plane. That portion of spherical-bearing surface which defines the fixed peripheral sliding zone $z1$ in cooperation with the corresponding portion of surface of the housing 82 is concave and the other portion of spherical-bearing surface which defines the floating zone $z2$ is convex. This results in an appreciable reduction in the height $h$ and an even more appreciable increase in the angles of thrust $a$ which are determined by the choice of the radii $r_1$ and $r_2$.

It is worthy of note that, by virtue of the small height of the bearing, the use of a hydrodynamic bearing of the type described in the foregoing is particularly advantageous in a thrust-bearing unit equipped with a spherical bearing in accordance with the invention, whether said spherical bearing is either concavo-convex or biconcave.

The use of a bearing device of larger overall size of the type illustrated in FIG. 1 would make it necessary to increase the distance between the bearing faces of the spherical bearing 81 which are applied against the annular flanges 831 and 832 and consequently the overall length of the thrust bearing, thus losing part of the advantages offered by the invention. The annular flanges or bearing shoulders of the shaft are separated from the bearing faces at 833 and 834 by a suitable alloy of the antifriction or self-lubricating type.

The spherical-bearing housing 82 is constituted by a casing 821 having a flat bottom wall on which the floating ring 822 is slidably mounted, said ring being adapted to cooperate with the convex face of the spherical bearing 81 so as to constitute the floating sliding zone $z2$. The casing 821 is closed by a cover 823 on which is formed an annular boss in cooperating relation with the concave face of the spherical bearing 81 so as to constitute the sliding zone $z1$.

The variations and gradients of running clearance in the zone $z2$ which appear when the shaft 83 is subjected to small angular displacements during operation of the machine — the zone $z1$ being in abutment — have very low values, geometrically of the first order with respect to the values of design clearance, and the operation of the articulated bearing consequently remains unaffected.

The radii $r1$ and $r2$ of the spherical zones $z1$ and and $z2$ are represented in FIG. 2 as being of equal value. However, there is no objection to the choice of radii having unequal values if this is made necessary by structural or working stresses.

As mentioned earlier, many alternative forms of construction are possible without thereby departing from the scope of the invention. In particular, this invention is applicable in all cases in which a self-aligning bearing or universal-joint assembly is necessary but in which a limited amount of space is available. Moreover, the spherical thrust bearing in accordance with the invention can comprise any known type of guide bearing; however, as has already been stated, the use of a hydrodynamic bearing of the type described with reference to FIG. 8 is particularly advantageous by reason of its small overall size.

What we claim is:

1. A guiding unit for preventing axial translational motion of a rotor shaft of a rotating machine with respect to a stator by permitting limited angular displacement of said shaft in any axial plane comprising a housing, a bearing support articulated within said housing, said housing being within said stator, two partial spherical sliding zones on said support having different centers, a ring, a complementary surface on said ring cooperating with one of said zones and said ring being free in a transverse direction with respect to the axis of rotation of said rotor within said housing.

2. A guiding unit according to claim 1, wherein said two partial spherical sliding zones of said bearing support are convex and a complementary concave surface on said housing cooperating respectively with one of said zones.

3. A guiding unit according to claim 1, wherein one of said spherical sliding zones of said bearing support is convex a complementary concave surface on said housing cooperating with said one zone and the other of said spherical sliding zones of said bearing support is concave and a complementary convex surface on said housing cooperating with said other zone.

4. A guiding unit according to claim 1, wherein said two spherical sliding zones of said bearing support are concave and two complementary convex surfaces on said housing each of said convex surfaces cooperating with one of said sliding zones.

5. A rotating machine having a vertical axis, wherein said machine comprises at least one unit for guiding a rotor shaft according to claim 1.

* * * * *